US009602511B2

(12) United States Patent
Duffell et al.

(10) Patent No.: US 9,602,511 B2
(45) Date of Patent: *Mar. 21, 2017

(54) USER AUTHENTICATION

(71) Applicant: International Business Machines Corporation, Armonk, NY (US)

(72) Inventors: John Duffell, London (GB); Sam Marland, Gwynedd (GB); Stephen D. Pipes, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,316

(22) Filed: Feb. 23, 2015

(65) Prior Publication Data
US 2015/0256539 A1 Sep. 10, 2015

Related U.S. Application Data

(63) Continuation of application No. 14/628,314, filed on Feb. 23, 2015.

(30) Foreign Application Priority Data

Mar. 10, 2014 (GB) .................................. 1404187.5

(51) Int. Cl.
*H04L 29/06* (2006.01)
*G06F 21/44* (2013.01)
(Continued)

(52) U.S. Cl.
CPC .......... *H04L 63/0876* (2013.01); *G06F 21/31* (2013.01); *G06F 21/32* (2013.01);
(Continued)

(58) Field of Classification Search
None
See application file for complete search history.

(56) References Cited

U.S. PATENT DOCUMENTS 7,437,437 B2 10/2008 Kennedy
7,770,212 B2 * 8/2010 Le Saint ............... G06F 21/445
713/193

(Continued)

OTHER PUBLICATIONS

IBM: List of IBM Patents or Patent Applications Treated as Related, Feb. 24, 2015.

(Continued)

*Primary Examiner* — Christopher Revak
(74) *Attorney, Agent, or Firm* — L. Jeffrey Kelly

(57) ABSTRACT

Providing a user apparatus access to a computer system including services and authentication levels. A service request is determined for at least one of the services from a user apparatus. A distributed authentication provider is negotiated with to provide an authentication level based access control for the plurality of authentication levels associated with the plurality of services. The user apparatus to is redirected to access the distributed authentication provider such that the user apparatus authenticates itself at the distributed authentication provider for the authentication level associated with the at least one of the services within the service request. The user apparatus is provided access to the at least one of the services within the service request based on a successful authentication at the distributed authentication provider for the authentication level associated with the at least one of the services within the service request.

9 Claims, 5 Drawing Sheets

(51) Int. Cl.
*G06F 21/31* (2013.01)
*G06F 21/32* (2013.01)
*G06F 21/35* (2013.01)

(52) U.S. Cl.
CPC .............. *G06F 21/35* (2013.01); *G06F 21/44* (2013.01); *H04L 63/0815* (2013.01); *G06F 2221/2115* (2013.01); *H04L 63/0884* (2013.01); *H04L 63/105* (2013.01); *H04L 2463/082* (2013.01)

(56) References Cited

U.S. PATENT DOCUMENTS

| | | | | |
|---|---|---|---|---|
| 8,826,394 | B1* | 9/2014 | Bastani | G06F 21/31 709/206 |
| 2006/0242675 | A1* | 10/2006 | Lee | H04N 7/17318 725/105 |
| 2007/0028117 | A1 | 2/2007 | Wong | |
| 2007/0056021 | A1* | 3/2007 | Annic | H04L 63/0281 726/4 |
| 2008/0263652 | A1* | 10/2008 | McMurtry | G06F 21/335 726/9 |
| 2010/0077457 | A1* | 3/2010 | Xu | H04L 63/08 726/4 |
| 2010/0107222 | A1* | 4/2010 | Glasser | G06F 21/6245 726/3 |
| 2010/0138899 | A1* | 6/2010 | Yamamoto | G06F 21/31 726/3 |
| 2012/0144464 | A1 | 6/2012 | Fakhrai et al. | |
| 2012/0282919 | A1* | 11/2012 | Jagger | H04B 1/1036 455/424 |
| 2013/0198807 | A1 | 8/2013 | Herbach et al. | |
| 2013/0232546 | A1* | 9/2013 | Shimono | G06F 21/41 726/3 |
| 2014/0282980 | A1* | 9/2014 | Kolluru | H04L 63/08 726/7 |
| 2015/0256541 | A1* | 9/2015 | Duffell | H04L 63/0876 726/3 |

OTHER PUBLICATIONS

Duffell et al, titled "User-Authentication", U.S. Appl. No. 14/628,314, filed Feb. 23, 2015, 33 pages.
Application No. 1404187.5 (United Kingdom), titled "User Authentication," filed on Mar. 10, 2014.
Search Report, Application No. GB1404187.5 (United Kingdom), Dated: Sep. 12, 2014.
OpenID Foundation, "OpenID Authentication 2.0—Final," Sections 2, 9 and 10.1, Dec. 5, 2007, http://openid.net/specs/openid-authentication-2_0.html, Accessed on Jan. 20, 2015.
International Business Machines Corporation, IBM Knowledge Center, Technical Overview, "IBM Security Identity Manager 6.0.0, IBM Security Identity Manager V6.0.0 Documentation," http://publib.boulder.ibm.com/infocenter/tivihelp/v2r1/index.jsp?topic=%2Fcom.ibm.itame.doc_6.0%2Fam60_admin74.htm, Accessed on Feb. 20, 2015.
Microsoft Corporation, Microsoft Developer Network, "Step-Up Authentication Scenario, Windows Identity Foundation," http://msdn.microsoft.com/en-us/library/ee517290.aspx, Accessed on Jan. 20, 2015.

* cited by examiner

USER AUTHENTICATION

BACKGROUND

The present invention relates to a providing a user access to a computer system comprising a plurality of services and a plurality of authentication levels.

Networked computer systems offering a multitude of services to authorized users are commonplace. Indeed, society is shifting towards an electronic way of life, in which many daily tasks are performed over such networks. An unwanted consequence of this shift in paradigm is that criminal activity is also evolving in the electronic realm. Cybercrime including identity theft is a serious problem, which results in several billions of dollar losses per annum, e.g. because a criminal has assumed the identity of someone else on such a network. This is particularly relevant to financial services, e.g. on-line banking, as well as to on-line shopping services such as Amazon, where user credit card details are stored under a user profile. Other relevant examples will be apparent to the skilled person.

To counteract such malicious behavior, a user of such a computer system typically has to go through an authentication process to gain access to the computer system, e.g., by providing a username and password. Although this reduces the risk of identity fraud, i.e. an imposter gaining access to the account of the user, such authentication may not be sufficient to prevent such identity fraud altogether.

For instance, there is an increasing trend to perform electronic transactions using many different service providers. To access these can require many different user identities and authentication methods to be remembered. Solutions to overcome this requirement to remember many different user identities have been proposed in the form of distributed authentication providers which enable the storage of many identities associated with a single user on an authentication provider apparatus or server.

Furthermore identity fraud can occur after a device is stolen following its owner is using a service that required authentication, the thief has immediate access to this service without it being protected by the authentication process. Even if the user is not yet authenticated, the mobile device may store at least some of the authentication data in auto complete functions, which may aid the criminal in accessing the service of interest. The same problem can occur if a user is forced by a criminal to access the service of interest or when the user accessed the service through a public access device such as a computer in an Internet cafe, and did not properly terminate his session before leaving the computer.

Part of this problem can be addressed by the use of several layers of authentication for critical services, but this can cause further friction with the end user as the end user typically has to memorize several complex passwords associated with the same identity, which often leads to forgotten authentication details, causing frustration for the end user and increasing cost for the service provider in terms of the provision of call centers and help desks that can assist the end user in regaining access to the requested services.

SUMMARY

According to an aspect of the present invention, a method, computer program product, and apparatus are disclosed for providing a user apparatus access to a computer system comprising a plurality of services and a plurality of authentication levels. A service request is determined for at least one of the services from a user apparatus. A distributed authentication provider is negotiated with to provide an authentication level based access control for the plurality of authentication levels associated with the plurality of services. The user apparatus to is redirected to access the distributed authentication provider such that the user apparatus authenticates itself at the distributed authentication provider for the authentication level associated with the at least one of the services within the service request. The user apparatus is provided access to the at least one of the services within the service request based on a successful authentication at the distributed authentication provider for the authentication level associated with the at least one of the services within the service request.

According to another aspect of the present invention, a method and apparatus are disclosed for providing a user apparatus access to a computer system comprising a plurality of services and a plurality of authentication levels. A service request is generated for at least one of the services. The service request is transmitted to a service provider. A distributed authentication provider is authenticated with for an authentication level associated with the at least one of the services within the service request. The at least one of the services within the service request are accessed from the service provider based on the successful authentication with the distributed authentication provider for the authentication level associated with the at least one of the services within the service request.

According to another aspect of the present invention, a method and apparatus are disclosed for providing a user apparatus access to a computer system comprising a plurality of services and a plurality of authentication levels. A service provider is negotiated with to provide an authentication level based access control for the plurality of authentication levels associated with the plurality of services. The user apparatus is authenticated based on an authentication request from the user apparatus for an authentication level associated with at least one of the services within a service request in order to enable the service provider to provide the user apparatus access to the at least one of the services within the service request.

DETAILED DESCRIPTION

Figure 1:
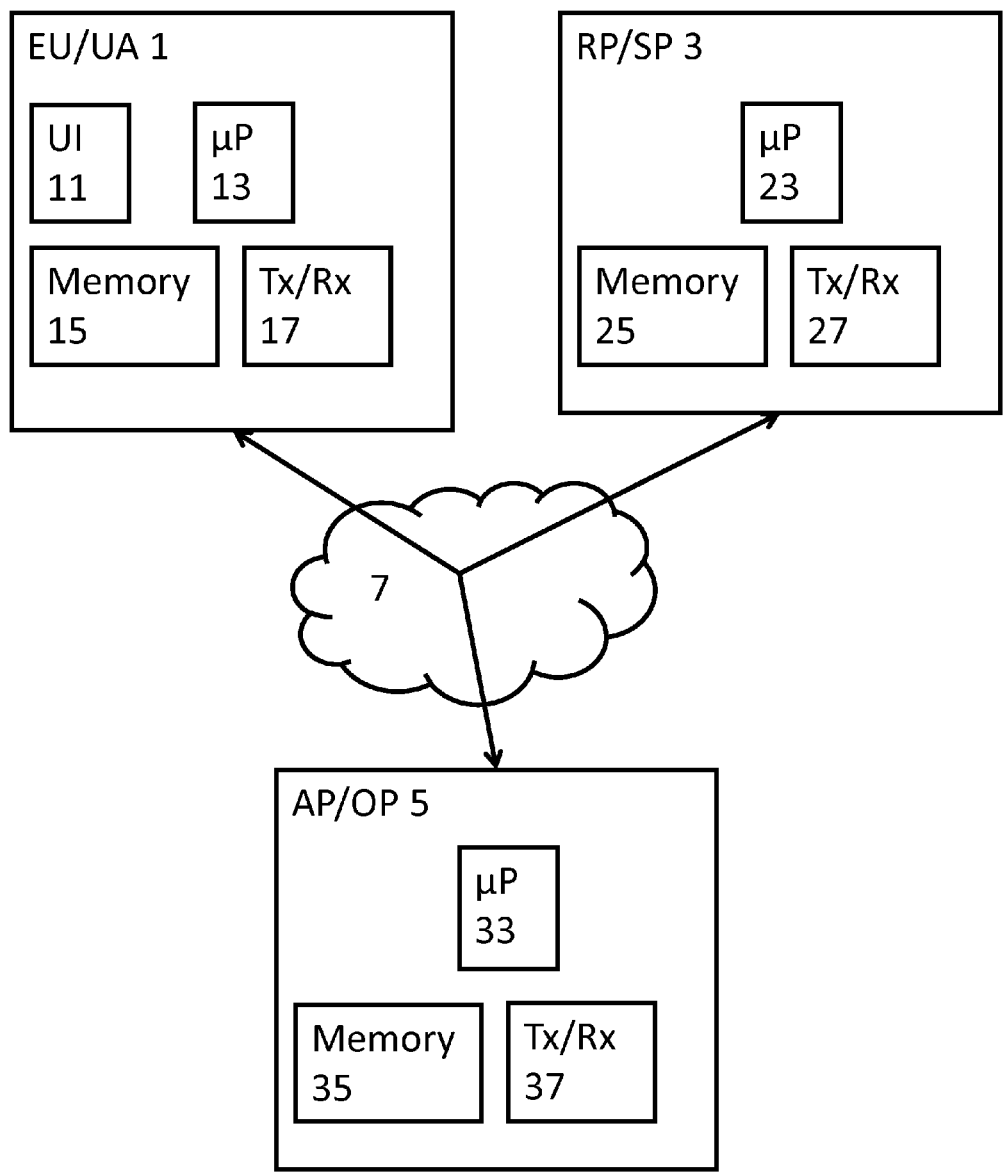
FIG. 1 schematically depicts a computer system according to some embodiments.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The various embodiments of the method of the present invention may be stored as computer-executable program code on a computer program product comprising a computer-readable storage medium. The computer-readable storage medium may be any medium that can be accessed by a computer for the retrieval of digital data from said medium. Non-limiting examples of a computer-readable storage medium include a CD, DVD, flash memory card, a USB memory stick, a random access memory, a read-only memory, a computer hard disk, a storage area network, a network server, an Internet server and so on.

In the context of the present application, a (computer) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

FIG. 1 schematically depicts an example computer system according to some embodiments. The computer system in some embodiments may comprise an end user/user agent (EU/UA) apparatus 1, which hereafter is referred to as the end user apparatus or end user. The end user apparatus 1 may be in some embodiments configured to be operated by the end user and may be further configured to access resources or services provided by a relaying party/service provider (RP/SP) apparatus 3 via a network 7. The relaying party/ service provider (RP/SP) apparatus 3 may be referred hereafter as the service provider apparatus 3. Furthermore it would be understood that the end user apparatus 1 may be configured to communicate via the network 7 to an authentication provider/open ID provider (AP/OP) apparatus 5 in order to enable multi-level distributed authentication of the end user at the service provider. The authentication provider/ open ID provider (AP/OP) apparatus 5 may be referred hereafter as the authentication provider apparatus 5. The authentication provider/open ID provider (AP/OP) apparatus 5 may be referred hereafter as the authentication provider apparatus 5. The authentication provider/open ID provider (AP/OP) apparatus 5 may further comprise a microprocessor (µP) 33, a memory 35, and a transceiver (Tx/Rx) 37.

The end user apparatus 1 may in some embodiments comprise at least one microprocessor (µP) 13. The microprocessor 13 may be any suitable processing means or apparatus and be configured to fetch and execute computer executable program code. The computer executable program code may for example be stored on a memory 15 which is a computer readable storage medium of any suitable form. The computer readable storage medium may for example include a CD, DVD, flash memory card, a USB memory stick, a random access memory, a read only memory, a computer hard disk, a storage area network, a network server, an internet server and so on.

Furthermore in some embodiments the end user apparatus 1 may comprise a user interface (UI) 11 configured to enable the user or end user to interact with the end user apparatus 1. The user interface 11 may for example comprise any suitable input apparatus or means such as: a keyboard, a mouse, a touch screen input, a digital key reader; a digital token reader. Furthermore the user interface 11 may comprise any suitable output apparatus or means such as: a display of any suitable format such as LED, OLED, LCD or printed display, a speaker or headset suitable for providing an audio output, or a tactile output such as a vibra for providing touch based output.

The end user apparatus 1 may further comprise a transceiver (Tx/Rx) 17 suitable for communicating via the network 7 to a suitable relaying party/service provider apparatus 3 and/or an authentication provider/open ID provider apparatus 5.

Figure 5A:
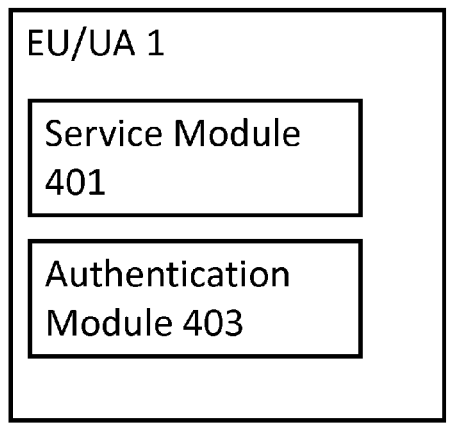
FIGS. 5a, 5b, and 5c schematically depict elements within the computer system shown in FIG. 1 according to some embodiments.

With respect to FIG. 5a the end user apparatus 1 is further shown with respect operational modules suitable for implementing distributed authentication according to some embodiments. The end user apparatus 1 may in some embodiments comprise a service module 401. The service module 401 may be configured to receive requests from the user interface to retrieve services and/or resources from a remote server such as the relaying party/service provider apparatus 3. The service module 401 may thus be configured to generate messages or requests which can be passed over the network 7 requesting these services and/or resources. Furthermore the service module 401 may be configured to receive these services and/or resources following a distributed multilevel authentication process.

The end user apparatus 1 may further comprise an authentication module 403. The authentication module 403 may be configured to communicate with the service provider apparatus 3 and/or the authentication provider apparatus 5 to enable the service module 401 to access the required or requested service or resource.

The computer system may further comprise a relaying party/service provider (RP/SP) apparatus 3. The service provider apparatus 3 may in some embodiments be configured to store and/or access services and/or resources and apply a multi-level authentication control system to the accessing of the services. In other words the service provider apparatus 3 may be configured to permit access to at least one service from a plurality of services based on a correct authentication of a user at a determined authentication level associated with the requested at least one service from the plurality of services. The relaying party/service provider 3 may further comprise a microprocessor (µP) 23, a memory 25, and a transceiver (Tx/Rx) 27.

Figure 5B:
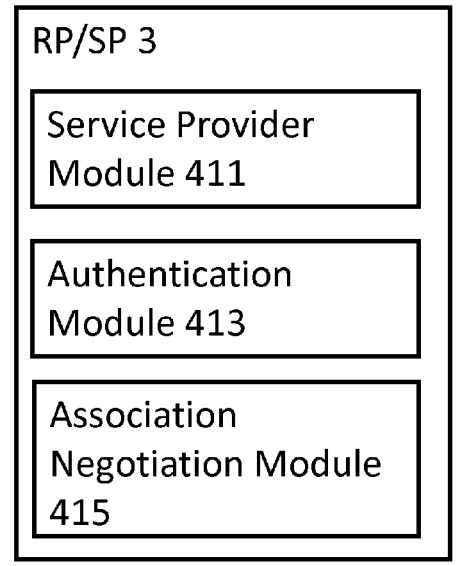

With respect to FIG. 5b the relaying party/service provider apparatus 3 is further shown with respect to operational modules suitable for implementing distributed authentication according to some embodiments. In some embodiments the service provider apparatus 3 comprises a service provider module 411. The service provider module 411 may be configured to receive requests for services and/or resources from the end user and furthermore provide or enable the access to these services and/or resources by an end user following the authentication provider determining a distributed multilevel authentication process for the level of authentication from the plurality of levels of authentication which matches or is associated with the requested at least one service from the plurality of services.

The service provider apparatus 3 may further comprise an authentication module 413. The authentication module 413 may be configured to receive authentication data or messages from the end user apparatus based on the authentication process between the end user apparatus 1 and the authentication provider apparatus 5.

The service provider apparatus 3 may further comprise an association negotiation module 415. The association negotiation module 415 may be configured to negotiate association rules with the authentication provider apparatus 5 in order to establish rules on authentication associated with levels of access to the services and/or resources provided by the service provider apparatus 3.

In some embodiments the computer system may further comprise the authentication provider/open identifier provider apparatus 5. The authentication provider apparatus 5 may be configured to authenticate the end user apparatus and provide the end user apparatus with a suitable token or data to be forwarded to the service provider indicating the level of authentication which has been obtained from the authentication provider apparatus 5.

Figure 5C:
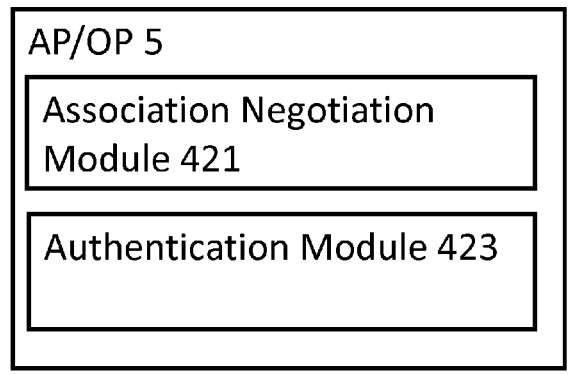

With respect to FIG. 5c the authentication provider apparatus 5 is shown with respect to operational modules suitable for implementing distributed authentication according to some embodiments. In some embodiments the authentication provider apparatus 5 may comprise an association negotiation module 421 which is configured to communicate and negotiate with the service provider apparatus 3 suitable levels of authentication and furthermore specifications associated with the levels of authentication.

Furthermore the authentication provider apparatus 5 may comprise an authentication module 423 configured to authenticate an end user apparatus 1 with respect to a determined authentication levels and therefore with respect to an associated authentication method associated with the determined at least one authentication level from a plurality of authentication levels. Furthermore the authentication module 423 may be configured to supply the end user apparatus 1 with a suitable token or data representing the at least one authentication level from the plurality of authentication levels.

Figure 2:
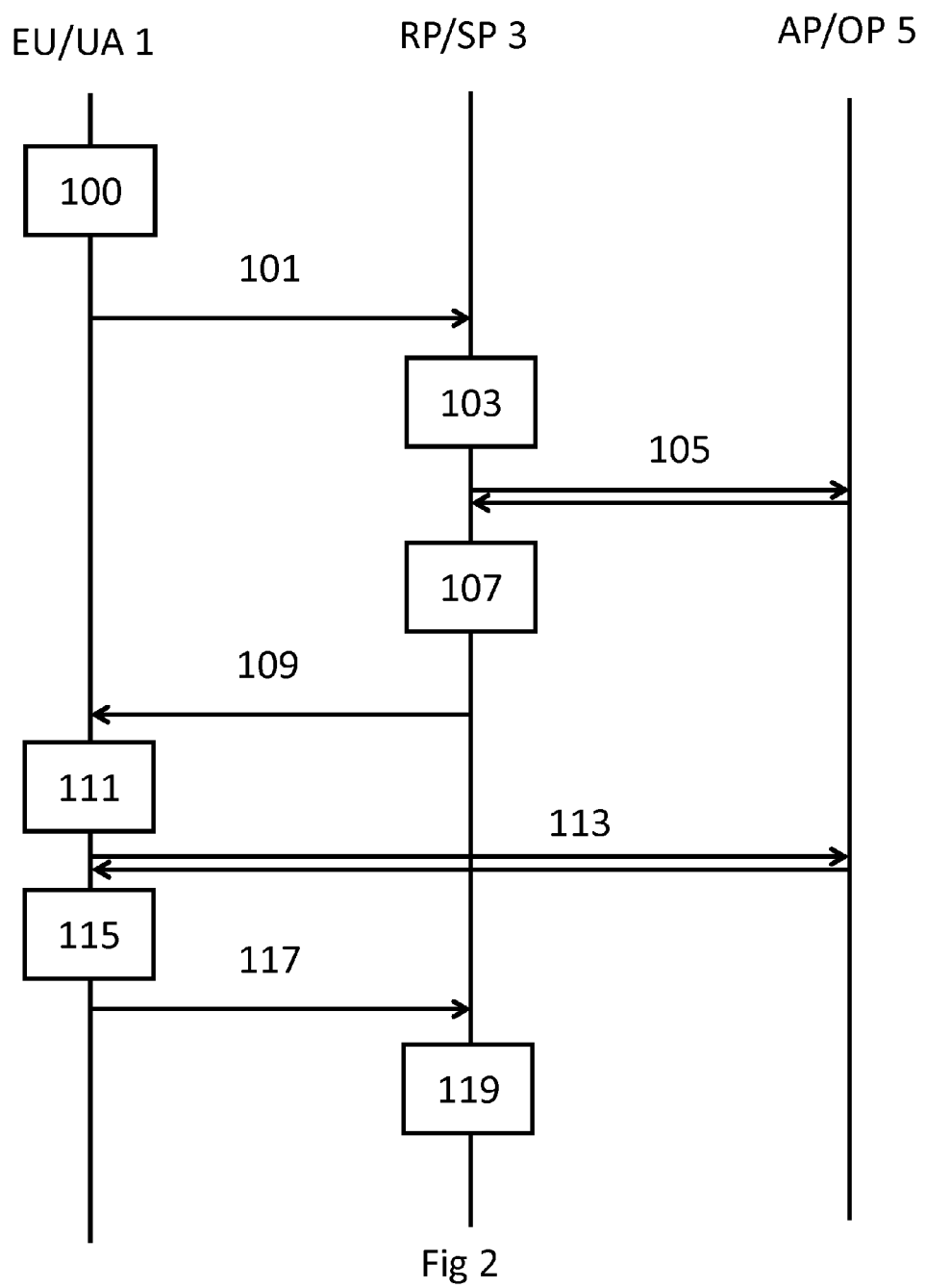
FIG. 2 schematically depicts an aspect of a method according to some embodiments.
Figure 3:
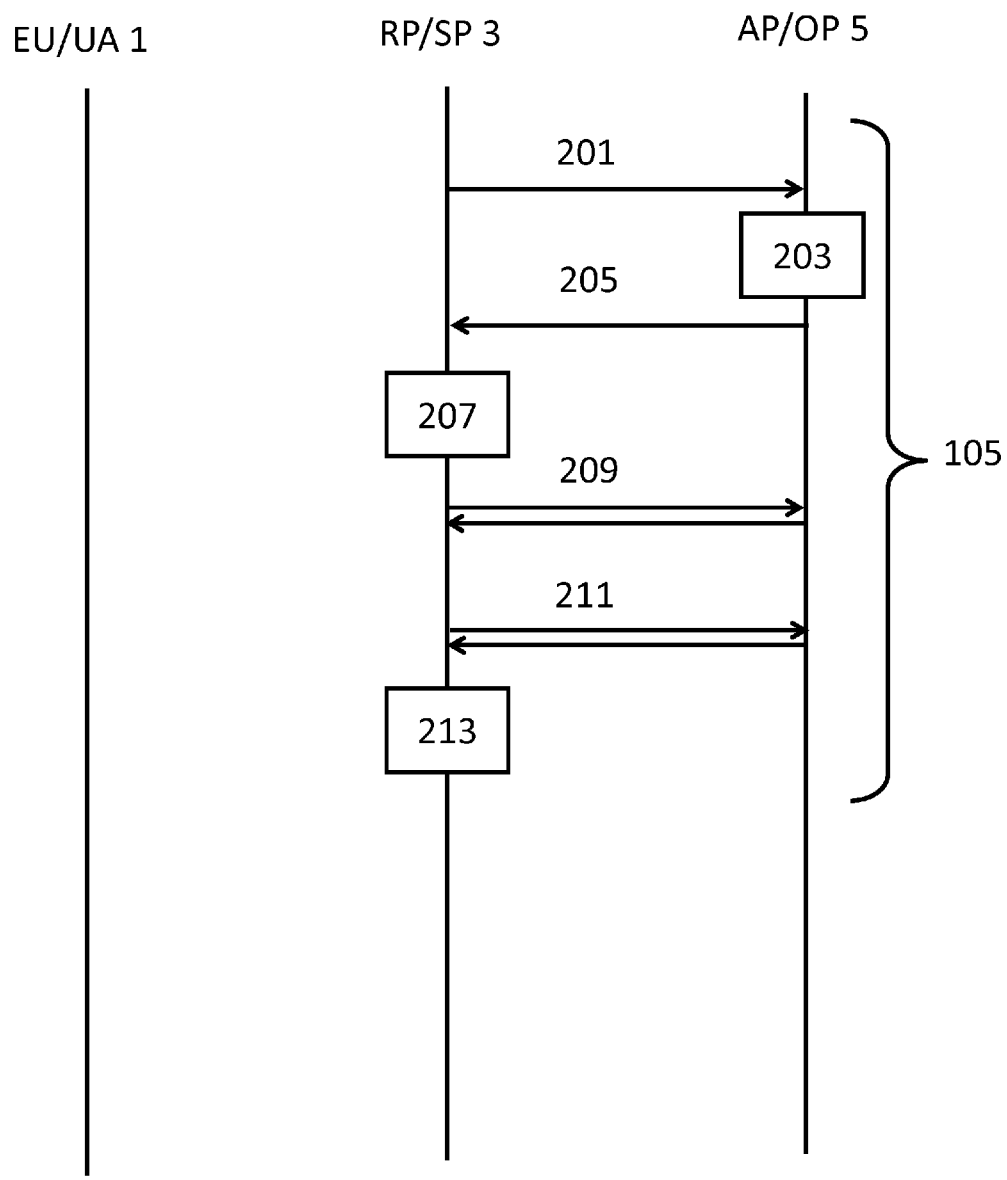
FIG. 3 schematically depicts an aspect of an association between a service provider and an authentication provider according to some embodiments.
Figure 4:
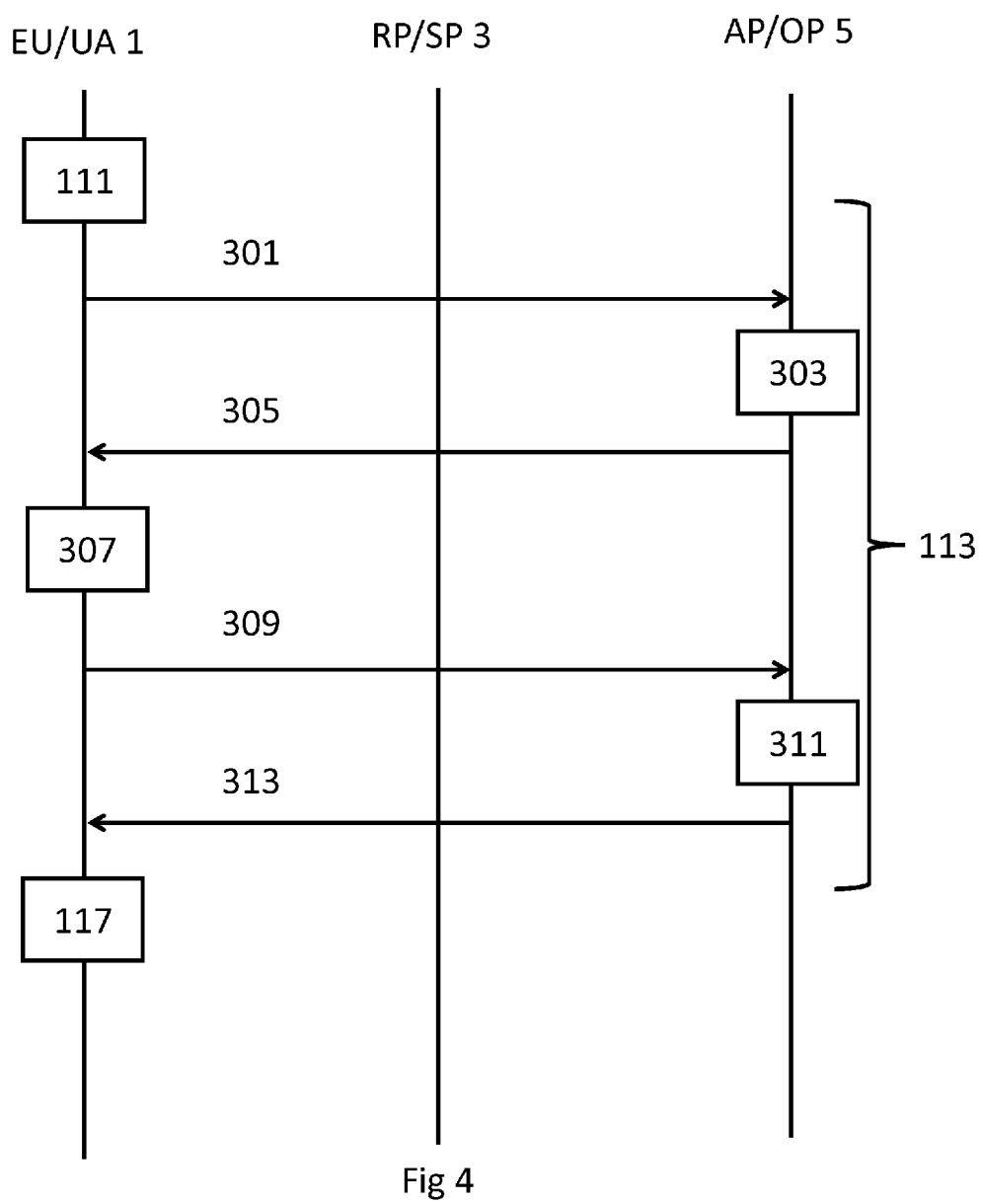
FIG. 4 schematically depicts an aspect of an authentication between an end user and an authentication provider according to some embodiments.

With respect to FIGS. 2 to 4 a series of operations are shown for multilevel distributed authentication of an end user apparatus 1 within a distributed authentication system according to some embodiments. The end user apparatus 1, and in some embodiments the service module 401, may be configured to generate a request for service or resource message. In some embodiments the message may further comprise an identifier identifying the end user apparatus.

The operation of generating the request for service message is shown in FIG. 2 by step 100.

The request for service message may then in some embodiments be sent to the service provider apparatus 3.

The operation of sending the request for service message to the service provider apparatus 3 is shown in FIG. 2 by step 101.

The service provider apparatus 3, and in some embodiments the service provider module 411, may determine or receive the request for service message. The service provider apparatus 3, and in some embodiments the service provider module 411, may then be configured to determine whether the service provider apparatus 3 is able to provide the service and furthermore determine the risk (of permitting access) to a resource/service for an authenticated user and therefore the risks associated with an unauthorized access of the service.

In some embodiments the service provider apparatus 3, and the service provider module 411 may be configured to determine whether there is an active or current association between the service provider apparatus 3 and the authentication provider apparatus 5. Where there is no active or current association, for example where there is no association between the service provider apparatus 3 and the authentication provider apparatus 5 or where the association between the service provider apparatus 3 and the authentication provider apparatus 5 has expired then the service provider apparatus 3 and in some embodiments the service provider module 411 may be configured to initiate the association negotiation module to begin a negotiation with the authentication provider apparatus 5 with respect to agreeing an association and determining a level based distributed authentication control specification.

The operation of determining that the service can be provided, the risk determination and the association determination is shown in FIG. 2 by step 103.

Where the service provider apparatus 3, and the service provider module 411 determines that the association has expired or there is no association between the service provider apparatus 3 and the authentication provider apparatus 5 then the service provider apparatus 3, and in some embodiments the association negotiation module 415, is configured to perform an association negotiation between the service provider apparatus 3 and the authentication provider apparatus 5.

The operation of negotiating an association between the service provider apparatus 3 and the authentication provider apparatus 5 is shown in FIG. 2 by step 105.

With respect to FIG. 3 the association negotiation operation is shown in further detail.

In some embodiments the service provider, and in particular the association negotiation module 415, may be configured to generate and transmit an association negotiation request to the authentication provider apparatus 5. The association negotiation request message may in some embodiments comprise a first operation in exchanging an encryption key between the service provider apparatus 3 and the authentication provider apparatus 5. For example in some embodiments the association negotiation request may comprise a first public Diffie-Hellman value.

The operation of generating and sending the association negotiation request is shown in FIG. 3 by step 201.

The authentication provider apparatus 5, and in some embodiments the association negotiation module 421, may then be configured to receive the initial association negation message and generate a shared secret (value) between the service provider apparatus 3 and the authentication provider apparatus 5. The authentication provider apparatus 5, and in some embodiments the association negotiation module 421, may then further generate a second part of the key exchange, for example by generating a second public Diffie-Hellman value to be sent to the service provider apparatus 3 which is used by the service provider apparatus 3 to generate the same shared secret (value).

The operation of generating a first shared secret (value) at the authentication provider apparatus 5 is shown in FIG. 3 by step 203.

The operation of generating a response to the service provider apparatus 3 suitable for the service provider apparatus 3 to generate the same shared secret (value) is shown in FIG. 3 by step 205.

In some embodiments the service provider, and in particular the association negotiation module 415, may be configured to generate the same shared secret (value) based on the association negation request response. It would be understood that in some embodiments more than one shared secret or shared secret value can be generated. In such embodiments, for example, each shared secret can be assigned or associated with an authentication level. In such examples the service provider apparatus 3 may verify that the authentication provider 5 has authenticated the user apparatus 1 for the authentication level by verifying that the shared secret and/or shared secret value received from the user apparatus 1 (originally provided by the authentication provider 5 when successful authentication has occurred at a determined authentication level) matches the assigned or associated level.

The operation of generating the same shared secret (value) at the service provider apparatus 3 is shown in FIG. 3 by step 207.

The service provider apparatus 3, and in some embodiments the association negotiation module 415, may be further configured to agree on a level negotiation protocol with the authentication provider apparatus 5, and in some embodiments the association negotiation module 415. In such embodiments the authentication negotiation modules 415, 415 exchange messages such that the authentication provider apparatus 5 and the service provider apparatus 3 agree on a service 'risk' (of permitting access) to a resource/service for an authenticated user to authentication level mapping.

The operation of exchanging messages to determine a risk-authentication level mapping is shown in FIG. 3 by step 209.

The service provider apparatus 3, and in some embodiments the association negotiation module 415, may be further configured to agree on a level negotiation protocol with the authentication provider apparatus 5, and in some embodiments the association negotiation module 415. In such embodiments the authentication negotiation modules 415, 421 exchange messages to agree on a specification of authentication methods which are bound to specific authentication levels. Thus for example a first level of authentication could require a simple password, a higher level of authentication could then require an additional biometric component or be provided by an additional digital token or similar only available to the end user operating the end user apparatus 1.

The operation of exchanging messages determining the specification of authentication methods to be bound to specific authentication levels is shown in FIG. 3 by step 211.

The service provider apparatus 3, and in some embodiments the authentication negotiation module 415 may then communicate with the authorization module 413, to enable service access control policy to include notion of levels to any request which has been received by the service provider module 411 from an end user apparatus 1.

The writing of access control policy to include the multiple authentication levels in a distributed authentication policy is shown in FIG. 3 by step 213.

An example of a group or plurality of services S1-S4 which could be offered by an example service provider apparatus 3 to an end user apparatus 1 may be a number of financial services and transactions. A non-limiting example of services may be where S1-S4 are services as depicted in Table 1, although it should be understood that many other types of services are of course equally feasible. Such services are typically associated with different risks (of permitting access) to a resource/service for an authenticated user. Thus for more critical services with a higher risk value or factor a higher level of authentication is required.

TABLE 1

| Service | Description |
| --- | --- |
| S1 | Locate ATM in ATM network of the computer system |
| S2 | Balance enquiry |
| S3 | Pay existing payee |
| S4 | Pay new payee |

Although in Table 1, S1-S4 are shown as single services, it is equally feasible that S1-S4 may be classes of services with multiple services per class. Thus for example each of the (classes of) services S1-S4 may be assigned an authentication method from the tiered authentication structure NoA-A4. For instance, each service S1-S4 is assigned an authentication level. Furthermore as discussed herein each authentication level may furthermore be mapped onto one or more authentication methods (where no authentication required is an authentication method where authentication is always successful). This mapping of authentication level to authentication method by way of non-limiting example is shown in Table 2.

Again, it is emphasized that the definition of the various authentication methods is by way of non-limiting example only, and that any suitable number and type of authentication methods may be included in the authentication mapping.

TABLE 2

| Method | Description |
| --- | --- |
| NoA | No authentication required |
| A1 | Prompt user for username and password |
| A2 | As A1, plus additional challenge question |
| A3 | As A2, plus additional key required |
| A4 | As A2, plus biometric verification required |
| A5 | As A3, plus biometric verification required |

In such a manner each service or service class S1-S4 is assigned or associated with an authentication method from the authentication structure by means of the mapping function. The mapping function itself as discussed herein is a function of a risk profile of the service and user. In other words, the mapping function may be chosen based on the level of confidence or trust in the identity of the user and the risk (of permitting access) to a resource/service for an authenticated user.

Where there is determined to be an active association between the service provider apparatus 3 and the authentication provider apparatus 5, the service provider apparatus 3, and in some embodiments the service provider module 411 may cause the authentication module 413 to generate an authentication redirection message to the end user apparatus 1. In some embodiments the authentication module 413 is configured to determine the authentication level required for the end user to be able to access the requested service and generate a suitable authentication level indicator.

The operation of determining an authentication level required based on the service request and the authentication specification, and generating a suitable redirection request comprising an indication of the authentication level required is shown in FIG. 2 by step 107.

The service provider apparatus 3 may then transmit the redirection request to the end user apparatus 1.

The operation of transmitting the redirection request is shown in FIG. 2 by step 109.

The redirection request may be received at the end user apparatus 1. The end user apparatus, and in some embodiments the authentication module 403, may then configured to generate an authentication request message comprising an authentication level indicator based on the indicator level found within the redirection request. For example in an OpenID distributed authentication system the indicator could be indicated by a value within a message field such as "openid.level".

The operation of generating an authentication request message comprising an authentication level indicator is shown in FIG. 2 by step 111.

The end user apparatus 1, and in some embodiments the authentication module 403 may then be configured to authenticate the end user apparatus 1 at the authentication provider apparatus 5, and in some embodiments the authentication module 423 for the authentication level indicated within the level indicator.

The operation of authenticating the end user apparatus 1 at the authentication provider apparatus 5 for the required authentication level is shown in FIG. 2 by step 113.

With respect to FIG. 4 an example operation of authenticating the end user apparatus 1 at the authentication provider apparatus 5 for the required or requested authentication level is shown in further detail.

In some embodiments the end user apparatus 1 may transmit the authentication request comprising the authentication level indicator to the authentication provider apparatus 5.

The operation of transmitting the authentication request with the authentication level indicator is shown in FIG. 4 by step 301.

The authentication provider apparatus 5, and in some embodiments the authentication module 423, may then be configured to determine or generate an authentication request response message. In some embodiments the authentication request response comprises an authorization specific response based on the authentication level and the negotiated authentication method agreed during the association between the service provider apparatus 3 and authentication provider apparatus 5. For example the determination of the authentication request response may comprise a looking up of the authentication method associated with the requested authentication level and informing the end user apparatus 1 which authentication method(s) are required.

The operation of determining or generating an authentication request response message based on the authentication level requested is shown in FIG. 4 by step 303.

The authentication provider apparatus 5 may further transmit the authentication request response message, which may comprise an authorization specific response based on the level and the negotiated authentication method agreed during the association between service provider apparatus 3 and authentication provider apparatus 5.

The operation of transmitting the authentication request response message based on the level of authentication required is shown in FIG. 4 by step 305.

The end user apparatus 1, and in some embodiments the authentication module 403, may then receive the authentication request response message and perform or generate suitable authentication method operations. For example in some embodiments where a first authentication level requires the end user apparatus to provide a user name and password then the end user apparatus 1 user interface can display this information and receive the suitable user name and password combination. Whereas where a different authentication level an additional identification or authentication token, then the suitable input can be enabled such as enabling a RFID data link where a RFID token is to be received, activating a fingerprint scanner or other body part scanner where a biometric token is to be received.

The operation of generating an authentication message based on the required authentication method is shown in FIG. 4 by step 307.

The authentication message comprising the requested or required authentication data from the end user apparatus 1 may then be transmitted to the authentication provider apparatus 5.

The operation of transmitting the authentication message is shown in FIG. 4 by step 309.

The authentication provider apparatus 5, and in some embodiments the authentication module 423, may then authenticate the authentication message from the end user apparatus using the determined method based on the authentication level required.

The operation of authenticating the authentication message from the end user using the method based on the authentication level required is shown in FIG. 4 by step 311.

The authentication provider apparatus 5, and in some embodiments the authentication module 423, may then determine, generate and transmit an authentication response message to the end user apparatus 1. The authentication response message may comprise a field indicating whether the authentication was successful or not successful, in other words whether the end user apparatus 1 is authenticated at the authentication level. The authentication response message may further comprise a field indicating where the authentication was successful. For example the message may comprise a field indicating that the end user apparatus 1 has been successfully authenticated at one authentication level but not another authentication level. The authentication response message may also in some embodiments comprise a field indicating the level at which the authentication was successful. Furthermore in some embodiments the authentication response message may comprise a field indicating whether the authentication was successful or not successful and/or the authentication level based on including a shared secret between the service provider apparatus 3 and the authentication provider apparatus 5, wherein the shared secret is further associated with a successful authentication at a determined level.

The determination and transmitting of an authentication response message to the end user apparatus 1 is shown in FIG. 4 by step 313.

The end user apparatus 1, and in some embodiments the authentication module 403, may be configured to generate a message to be forwarded to the service provider apparatus 1 indicating a successful or otherwise authentication from the authentication provider for a specific authentication level based on the authentication response from the authentication apparatus.

This operation of generating a forwarding message is shown in FIG. 2 by step 115.

The forwarded message may then be transmitted from the end user apparatus 1 to the service provider apparatus 3.

The operation of transmitting the forwarding message is shown in FIG. 2 by step 117.

The service provider apparatus 3, and in some embodiments the authentication module 413 may receive the forwarded message from the end user apparatus, and verify whether the forwarded message indicates a successful authentication of the end user apparatus 1 at the authentication provider apparatus 5. The verification of the authentication, for example, may be determined by verifying the shared secret value against the association shared value.

The service provider apparatus 3, and in some embodiments the service provider module 411 may, when the authentication is verified, be configured to provide the service and/or resource to the end user apparatus 1 and in some embodiments the service module 401.

The operation of enabling access based on the level of authentication is shown in FIG. 2 by step 119.

It would be understood that in some embodiments where the user is required to authenticate for a different or further authentication level, and the association between the service provider apparatus 3 and authentication provider apparatus 5 is active or valid be configured to perform the operations as shown in FIG. 4, in other words requesting authentication for the different or further authentication level without the need to perform a new association.

Furthermore although in some examples provided herein the distributed authentication service is provided in the form of an open ID distributed authentication service it would be understood that any suitable distributed authentication operation could be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for providing a user apparatus access to a computer system comprising a plurality of services associated with a plurality of authentication levels, the method comprising:
generating, by the user apparatus, a service request for at least one service from the plurality of services;
transmitting the service request to a service provider;
authenticating with a distributed multilevel authentication provider for an authentication level associated with the at least one service within the service request, wherein the authentication level is determined from the plurality of authentication levels based on one or more association rules negotiated between the distributed multilevel authentication provider and the service provider, the determined authentication level is associated with an authentication method to provide a level of access to the at least one service, wherein the level of access is based on a risk of an unidentified user apparatus accessing the at least one service; and
accessing the at least one service within the service request from the service provider based on a forwarded message transmitted by the user apparatus and received by the service provider, wherein the forwarded message communicates a successful authentication with the distributed multilevel authentication provider for the authentication level associated with the at least one service within the service request based on verifying a shared secret value associated with the authentication level,
wherein the shared secret value is generated by the service provider in response to a public Diffie-Hellman value sent by the distributed multilevel authentication provider.

2. The method as claimed in claim 1 further comprising receiving a redirection message from the service provider, the redirection message comprising an authentication level indicator for an authentication level associated with the at least one service within the service request.

3. The method as claimed in claim 1, wherein authenticating with the distributed multilevel authentication provider for an authentication level associated with the at least one service within the service request comprises:
generating an authentication request for the distributed multilevel authentication provider, the authentication request comprising an authentication level indicator for an authentication level associated with the at least one service within the service request;
determining an authentication request response from the distributed multilevel authentication provider, the authentication request response comprising an indicator specifying an authentication specification based on the authentication level associated with the at least one service within the service request;
generating an authentication message for the distributed multilevel authentication provider, the authentication message comprising data based on the authentication specification within the authentication request response; and
receiving from the distributed multilevel authentication provider an authentication response message, the authentication response message comprising an indicator authenticating the user apparatus for the authentication level associated with the at least one service within the service request.

4. The method as claimed in claim 1, wherein accessing the at least one service within the service request from the service provider based on the successful authentication with the distributed multilevel authentication provider for the authentication level associated with the at least one service within the service request comprises generating an authentication message for the service provider, the authentication message comprising the indicator from the distributed multilevel authentication provider authenticating the user apparatus for the authentication level associated with the at least one service within the service request.

5. A method for providing a user apparatus access to a computer system comprising a plurality of services associated with a plurality of authentication levels, the method comprising:
negotiating one or more association rules with a service provider such that an authentication level is determined from the plurality of authentication levels based on the one or more association rules, the determined authentication level is associated with an authentication method to provide a level of access to at least one service from the plurality of services to the user apparatus, wherein the level of access is based on a risk of an unidentified user apparatus accessing the at least one service; and
authenticating the user apparatus based on an authentication request from the user apparatus for the authentication level associated with the at least one service in order to enable the service provider to provide the user apparatus access to the at least one service based on a forwarded message transmitted by the user apparatus and received by the service provider, wherein the forwarded message indicates a successful authentication for the authentication level associated with the at least one service based on verifying a shared secret value associated with the authentication level,
wherein the shared secret value is generated by the service provider in response to exchanging a public Diffie-Hellman value with the service provider.

6. The method as claimed in claim 5, wherein negotiating the one or more association rules with the service provider comprises negotiating with the service provider at least one shared secret for authenticating an authentication message response from the user apparatus.

7. The method as claimed in claim 5, wherein negotiating the one or more association rules with the service provider comprises negotiating a value exchange with the service provider such that the plurality of services can be mapped to the plurality of authentication levels.

8. The method as claimed in claim 5, wherein authenticating the user apparatus for an authentication level associated with the at least one service further comprises:
determining an authentication specification based on the authentication level associated with the at least one service within a service request;
receiving an authentication message from the user apparatus, the authentication message comprising data based on the authentication specification;
determining the authentication message data authenticates the user apparatus for the authentication level associated with the at least one service within the service request; and
generating an authentication response message for the user apparatus comprising an indicator for authenticating the user apparatus at the service provider for the authentication level associated with the at least one service within the service request.

9. A user apparatus comprising:

a service module to generate by a user apparatus a service request for at least one service from a plurality of services wherein the service request is transmitted to a service provider;

an authentication module to authenticate with a distributed multilevel authentication provider for an authentication level associated with the at least one service, wherein the authentication level is determined from the plurality of authentication levels based on one or more association rules negotiated between the distributed multilevel authentication provider and the service provider, the determined authentication level is associated with an authentication method to provide a level of access to the at least one service, wherein the level of access is based on a risk of an unidentified user apparatus accessing the at least one service; and further access the at least one service within the service request from the service provider based on a forwarded message transmitted by the user apparatus and received by the service provider, wherein the forwarded message indicates a successful authentication with the distributed authentication provider for the authentication level associated with the at least one service within the service request based on verifying a shared secret value associated with the authentication level, wherein the shared secret value is generated by the service provider in response to a public Diffie-Hellman value sent by the distributed multilevel authentication provider.

* * * * *